Figure 1:
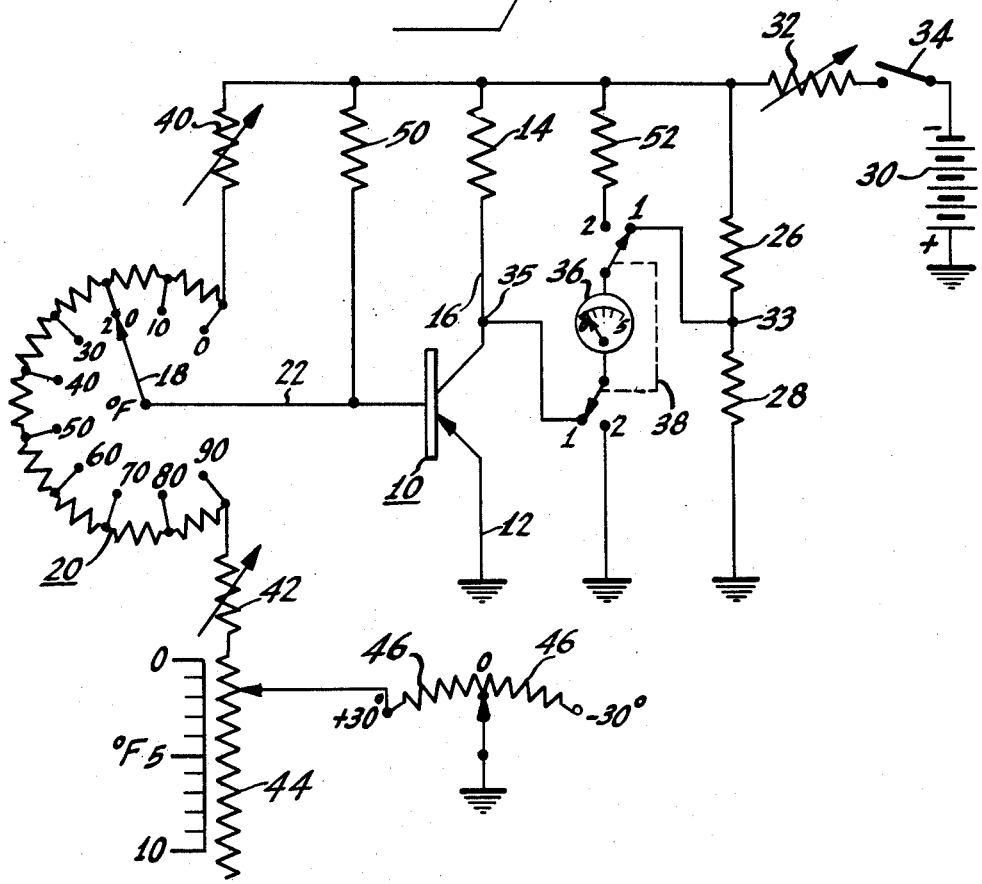

Feb. 5, 1963    L. E. BARTON    3,076,339
THERMOMETER
Filed April 7, 1960

INVENTOR.
LOY E. BARTON
BY
ATTORNEY ived Patent Office 3,076,339
Patented Feb. 5, 1963

3,076,339
THERMOMETER
Loy E. Barton, Princeton, N.J., assignor to Radio Corporation of America, a corporation of Delaware
Filed Apr. 7, 1960, Ser. No. 20,657
6 Claims. (Cl. 73—362)

This invention relates generally to thermometers, and more particularly to an improved thermometer that utilizes a transistor as the heat sensing element. The thermometer of the present invention is particularly useful in the medical field, as a fever thermometer, and in other situations where it is desired to measure temperatures relatively quickly, accurately, continuously and/or at a remote point.

The conventional, glass, fever thermometer that employs liquid mercury as the indicating means has been used extensively for indicating body temperatures. While glass thermometers offer some advantages, they have many disadvantages. The usual, clinical, glass thermometers are easily subject to breakage, and they must be removed from the patient to be read. Unless a sufficient time has been allowed for the mercury to expand, one cannot be sure that the indicated temperature on the glass thermometer is accurate.

It has also been proposed to use a heat sensitive element in an electrical circuit to indicate changes in temperature. However, the temperature range and sensitivity of the prior art circuits of this sort have been relatively limited.

Accordingly, it is an object of the present invention to provide an improved thermometer which is free from the aforementioned and other disadvantages of prior art thermometers. More particularly, it is an object of the present invention to provide a novel thermometer employing a transistor as a heat sensing element in a circuit that overcomes the aforementioned disadvantages of prior art thermometers employing electrical circuits.

Another object of the present invention is to provide an improved thermometer that is not easily damaged and does not have to be removed from its recording position to be read.

Still another object of the present invention is to provide an electrical thermometer that indicates relatively lower temperatures, and much more quickly, than is possible with conventional, glass thermometers.

A further object of the present invention is to provide an improved thermometer that can indicate temperatures continuously, both locally and at a remote point.

Still a further object of the present invention is to provide an improved thermometer that may be used to measure temperatures over a relatively wide range of temperatures and to indicate relatively small temperature differentials from any temperature setting.

Another object of the present invention is to provide an improved thermometer utilizing a transistor in an electrical circuit that is relatively simple in form, very reliable in operation, and highly efficient in use.

In accordance with the present invention, one form of the novel thermometer comprises a transistor whose conductance varies with its temperature. The emitter-collector path of the transistor is connected in an electrical circuit, and variable means are provided to apply to the base of the transistor, from a range of bias voltages, a voltage to control the conductance of the transistor, whereby to control the current through the circuit. A temperature scale is associated with the aforementioned bias voltage means to indicate the temperature of the transistor when the current through the emitter-collector path of the transistor is a predetermined value.

Figure 2:
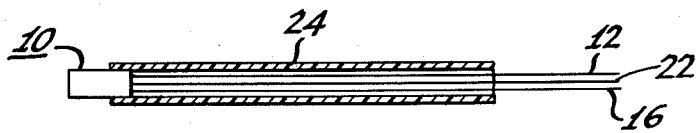

The novel features of the present invention, both as to its organization and methods of operation, as well as additional objects and advantages thereof, will be more readily understood from the following description, when read in connection with the accompanying drawing, in which similar reference characters refer to similar parts, and in which:

FIG. 1 is a schematic diagram of one form of thermometer in accordance with the present invention; and FIG. 2 is a view showing the heat sensing transistor of the thermometer circuit and the electrical connections thereto within a portion of insulating tubing, the latter being shown in cross-section.

Referring, now, to FIG. 1, there is shown a PNP transistor 10 connected in an electrical circuit to indicate the ambient temperature about the transistor 10. The emitter of the transistor 10 is connected to a common connection, such as chassis ground, through an electrical conductor 12. The collector of the transistor 10 is connected to one end of a resistor 14 through an electrical conductor 16, and the base of the transistor 10 is connected to the variable arm 18 of a potentiometer 20 through an electrical conductor 22. The electrical conductors 12, 16 and 22 may be made as long as necessary so that the transistor 10, the heat sensitive element of the thermometer, may be disposed in the place where the temperature is to be recorded. These conductors comprise insulated wires and may be enclosed within a tube 24 of electrical insulating material, such as plastic tubing, for protection purposes. The tube 24 may fit tightly around a portion of the transistor 10 to provide a water-tight seal, as shown in FIG. 2, if the transistor 10 is to be used to sense the temperature of liquids. The transistor 10 is relatively small, being a cylinder having a diameter of about ⅛ inch and a height of about ¼ inch, for example, and reaches an equilibrium with ambient heat within a relatively short time in comparison to a glass thermometer. For example, the transistor 10 will react at least five times as fast as a glass, fever thermometer to a change in five degrees Fahrenheit.

The transistor 10 is connected in a bridge circuit in which it comprises one of the arms. The resistor 14 is connected in series with the emitter-collector path of the transistor 10 and comprises the second arm of the bridge circuit. Serially connected resistors 26 and 28 form the remaining two arms of the bridge circuit. One end of the resistor 28 is connected to the common connection or ground, and one end of the resistor 26 is connected to the negative terminal of a source of voltage, such as a battery 30, through a series circuit comprising a variable resistor 32 and a switch 34. The positive terminal of the battery 30 is connected to the common connection. The common junction 33 of the resistors 26 and 28 and the common junction 35 of the transistor 10 and the resistor 14 are connected to each other through a series circuit comprising a current indicating meter 36 and one position of a double pole, double throw switch 38. It will now be understood that, when the voltage at the junction 33 is the same as the voltage at the junction 35, the meter 36 will indicate zero. This condition of bridge balance will always prevail when the collector current of the transistor 10 has a predetermined value.

The conductance of the transistor 10 varies with its temperature. Calibrated voltage bias means are therefore provided to adjust the conductance of the transistor 10, whereby to cause the collector current to be the aforesaid predetermined value. The value of voltage bias that has to be applied to the base of the transistor 10 to cause the collector current to be the predetermined value is proportional to the temperature of the transistor 10. The voltage biasing means comprises a series circuit connected between the common connection and the junction of the resistor 14 and the resistor 32. This series circuit includes a variable resistor 40, the resistor of the potentiometer 20, a variable resistor 42, a variable resistor 44 and a center tapped resistor 46, in the order named. A resistor 50, to take care of substantially all of the base current of the transistor 10, is connected between the base of the transistor 10 and the junction of the resistor 14 and the resistor 40. The resistor of the potentiometer 20 may be tapped to provide any desired number of taps and steps therebetween, ten taps being illustrated in the drawing whereby the potentiometer resistor is divided into 9 substantially equal resistors. The aforementioned taps are marked in equal steps (10° F. per step) of a temperature scale in terms of degrees Fahrenheit, for example, from zero degrees to ninety degrees. To carry out the illustrated example, the variable resistor 44 is divided into 10 equal parts that are marked in steps of 1° of a temperature scale in terms of degrees Fahrenheit, from 1 to 10 degrees. It will be understood that fractions of a degree may be estimated by the position of the arm on the resistor 44 when the arm is between two markings on the scale.

When the center tap of the resistor 46 is connected to the common connection, the temperature of the transistor 10 is given by the sum of the temperatures indicated on the temperature scales associated with the potentiometer 20 and the resistor 44. The scale of the meter 36 may be calibrated in terms of degrees Fahrenheit, say, for example, from 1 to 5 degrees Fahrenheit. When the bridge is unbalanced, but the reading through the meter 36 is on the scale of the meter 36, the temperature of the transistor 10 is given by the sum of the temperatures indicated on the scales associated with the potentiometer 20, the resistor 44, and the meter 36.

Means are provided to supply a uniform, predetermined voltage to the bridge circuit. To this end, the meter 36 can be connected across the battery 30 through the serially connected circuit comprising the double pole, double throw switch 38, in a second position thereof, a resistor 52, the resistor 32 and the switch 34. Thus, by closing the switch 34, by switching the switch 38 to its second position, and by adjusting the variable resistor 32, a predetermined, desired voltage, say, 7 volts, may be applied across the bridge circuit.

The required bias voltage on the base of the transistor 10 varies substantially linearly with temperature. With the transistor described and illustrated, the biasing voltage increments were decreased by approximately 1.66 millivolts for a rise of each degree Fahrenheit. In other words, for each degree rise in temperature of the transistor 10, the bias voltage was decreased by 1.66 millivolts to maintain a given collector current, that is, to maintain the bridge circuit balanced. The values of the components in the list below were based upon these requirements.

A very satisfactory thermometer, in accordance with the present invention, was constructed with components of the following values:

| Component: | Value |
| --- | --- |
| Resistor 14 | 22K ohms. |
| Resistor 26 | 6.8K ohms. |
| Resistor 28 | 470 ohms. |
| Resistor 32 | 1,000 ohms max. |
| Resistor 40 | 18K ohms approx. |
| Resistor 42 | 200 ohms max. |
| Resistor 44 | 40 ohms calibrated in 10 steps of 3.33 ohms. |
| Resistor 46 | 200 ohms (total). |
| Resistor 50 | 1.4 meg. approx. |
| Resistor 52 | 140K ohms. |
| Potentiometer 20 | 9 resistors, each having a resistance of 33.3 ohms. |
| Transistor 10 | 2N105. |
| Battery 30 | 7½ volts. |
| Meter 36 | 0 to 50 microampere movement. |

The aforementioned values are illustrative and are not to be considered in a limiting sense.

The temperature scales associated with the potentiometer 20 and the variable resistor 44 may be calibrated in the following manner to read the temperatures marked: The transistor 10 is placed in an environment of known temperature, near the highest temperature to be recorded, say, 100° F., for example. The potentiometer 20 and the resistor 44 are set to indicate the known temperature (90° F.+10° F.), and the variable resistor 42 is adjusted until the meter 36 reads zero. Next, the transistor 10 is placed in a known temperature environment near the cold end of the temperature scale, say 32° F. The potentiometer 20 and the variable resistor 44 are set to indicate 32° (30° F.+2° F.), and the variable resistor 40 is adjusted until the meter 36 reads zero. The thermometer is now calibrated and will indicate any temperature of the transistor 10 by the settings of the potentiometer 20 and the variable resistor 44 when the meter 36 reads zero.

For normal operation, that is, to read the temperature scales directly, the resistor 46 is connected to the common connection at its midpoint. The temperature of the transistor 10 is indicated by the sum of the temperatures indicated by the potentiometer 20, the variable resistor 44 and the meter 36, if the meter reads other than zero. The temperature range may be increased 30° by cutting out the resistors 46. Conversely, the temperature range may be decreased 30° by inserting the full resistance of the resistors 46 into the voltage biasing circuit. Changes of 0.1° F. may be easily read on the meter 36.

In the example shown and described, it can be ascertained that the bias voltage range of the potentiometer 20 and the resistors 44 and 46 will indicate 100° F. when the center tap of the resistor 46 is connected to the common connection. Thus, for a bias voltage change of 0.00166 volt per degree Fahrenheit, the total voltage change is 0.166 volt for the 100° F. range. If it is desired to measure the temperature of an object near the temperature of Dry Ice, for example, temperature biasing increments would be necessary for about −109° F. The bias for this range would be about 109×0.00166 volt, or about 0.18 volt, added to the bias at zero degrees F.

The temperature range can be extended in a like manner to other low temperatures approaching absolute zero. At a relatively low temperature, below −100° F., the bias voltage versus temperature curve departs somewhat from substantially a straight line, but a calibrated curve for very low temperatures may be obtained easily. The bias voltage that is normally negative for PNP germanium transistors is zero volts at approximately 160° F. This temperature would then be the normal upper limit that could be recorded by germanium transistors. If silicon transistors were used, the zero bias limitation would occur at about 300° F. The low temperature range for the silicon transistor would be similar to the germanium transistor, but the base bias would be higher for a given temperature.

From the foregoing description, it will be apparent that there has been provided an improved thermometer that is not easily damaged, that records temperatures relatively much lower than is possible with glass-mercury thermometers, and that does not have to be removed from the environment of the recorded temperature in order to be read. The temperature may be indicated very quickly, and the sensing element may be at a point remote from the temperature indicating means. Once the temperature of an environment has been determined, departures from this temperature may be observed by noting changes on the meter 36, or by resetting the potentiometer and variable resistor associated with the temperature scales.

What is claimed is:

1. Temperature indicating apparatus comprising a circuit having a transistor as a component thereof, said transistor having three electrodes and a conductance that varies with its temperature, means to apply to one of said electrodes a bias with a voltage from a range of voltages to control the conductance between the other two of said electrodes to a predetermined value, and a temperature scale on said bias means, said bias means being calibrated to indicate the temperature of said transistor.

2. Temperature indicating apparatus comprising a circuit having a transistor as a component thereof, means to apply a source of voltage in said circuit to cause current to flow therein, said transistor having three electrodes and an impedance that varies with temperature, variable means to bias one of said electrodes with any voltage in a range of voltages to control the impedance between the other two of said electrodes and thereby to set the current in said circuit at a predetermined value, and a temperature scale on said bias means, said bias means being calibrated to indicate the temperature of said transistor.

3. An electronic thermometer comprising a circuit having a transistor, said transistor having an emitter, a collector and a base, the emitter-collector path of said transistor being connected in said circuit, and variable means to apply to said base a selected voltage of a range of voltages to control the conductance of said transistor whereby said transistor will cause a predetermined amount of current to flow in said circuit, the conductance of said transistor being variable with the temperature of said transistor, and said variable means being calibrated to indicate the temperature of said transistor.

4. An electronic thermometer comprising a circuit having a transistor, said transistor having an emitter, a collector and a base, the emitter-collector path of said transistor comprising a portion of said circuit, variable means to apply to said base a selected voltage from a range of voltages to adjust the conductance of said transistor to a predetermined value, said conductance of said transistor being variable with the temperature of said transistor, and a scale associated with said variable means to indicate the temperature of said transistor, said variable means comprising means to calibrate said scale with a known temperature of said transistor.

5. In combination, a circuit comprising the emitter-collector path of a transistor, variable means to apply to the base of said transistor a bias voltage from a range of voltages to control its conductance and thereby to set the current through said emitter-collector path at a predetermined value, means in said circuit to indicate said predetermined value of current, the conductance of said transistor being variable with its temperature, and a temperature scale on said bias means, said bias means being calibrated to indicate the temperature of said transistor.

6. In combination, a circuit comprising the emitter-collector path of a transistor, variable means to apply to the base of said transistor a bias voltage from a range of voltages to control its conductance and thereby to set the current through said emitter-collector path at a predetermined value, means connected in said circuit to indicate said predetermined value of current, said conductance of said transistor being variable with its temperature, a temperature scale on said bias means, said bias means being calibrated to indicate the temperature of said transistor, and a temperature scale on said indicating means to indicate in conjunction with said first-mentioned temperature scale the temperature of said transistor when said current differs within a predetermined range from said predetermined value.

References Cited in the file of this patent

UNITED STATES PATENTS

| | | |
|---|---|---|
| 2,696,739 | Endres | Dec. 14, 1954 |
| 2,946,008 | Kallmann | July 19, 1960 |

OTHER REFERENCES

Lin and Barco: "Temperature Effects in Circuits Using Junction Transistors," Transistors I, published by RCA Laboratories (copy in Scientific Library TK 7872T 73 T7), pp. 380–381.